United States Patent [19]

Hehl

[11] Patent Number: 4,877,389
[45] Date of Patent: Oct. 31, 1989

[54] LOCKING APPARATUS FOR LOCKING A DETACHABLY MOUNTED PLASTICIZING CYLINDER OF A PLASTICIZING UNIT IN OPERATIVE POSITION TO A CARRYING BLOCK OF AN INJECTION UNIT OF AN INJECTION MOLDING MACHINE

[76] Inventor: Karl Hehl, Arthur-Hehl-Str. 32, D-7298 Lossburg 1, Fed. Rep. of Germany

[21] Appl. No.: 256,609

[22] Filed: Oct. 12, 1988

[30] Foreign Application Priority Data

Oct. 22, 1987 [DE] Fed. Rep. of Germany ....... 3735769

[51] Int. Cl.⁴ ...................... B29C 45/03; B29C 45/62; B29C 45/50
[52] U.S. Cl. .................................................. 425/190
[58] Field of Search .................... 425/190, 192 R, 185, 425/574, 587

[56] References Cited

U.S. PATENT DOCUMENTS

| | | | |
|---|---|---|---|
| 3,594,869 | 7/1971 | Sher | 425/192 |
| 3,924,991 | 12/1975 | Melcher | 425/574 |
| 4,708,622 | 11/1987 | Hehl | 425/185 |
| 4,768,944 | 9/1988 | Krebser et al. | 425/574 |

FOREIGN PATENT DOCUMENTS

| | | | |
|---|---|---|---|
| 0198364 | 10/1986 | European Pat. Off. | 425/587 |
| 0198410 | 10/1986 | European Pat. Off. | 425/574 |
| 284780 | 5/1980 | Fed. Rep. of Germany | 425/587 |

Primary Examiner—Willard Hoag
Attorney, Agent, or Firm—Spencer & Frank

[57] ABSTRACT

The plasticizing cylinder of an injection-molding device is adapted to be locked by a locking apparatus which comprises diametrically opposite sliders, which are guided on the carrying block of the injecting unit, which carrying block carries the plasticizing cylinder. The sliders are movable to a locking position, in which they are received by recesses of the plasticizing cylinder. The sliders are interconnected by hydraulic piston-cylinder units having cylinders proper, which are integrated in one of the sliders, and piston rods, which are connected to the other slider. The sliders are hydraulically movable out of their locking position and can be moved under spring force to their locking position. Alternatively, the sliders may be fully hydraulically operated. Such a locking apparatus can be manufactured in series at low cost. The locking appartus constitutes an operative unit, which is detachably mounted on the carrying block and can be replaced with a few manual operations.

9 Claims, 7 Drawing Sheets

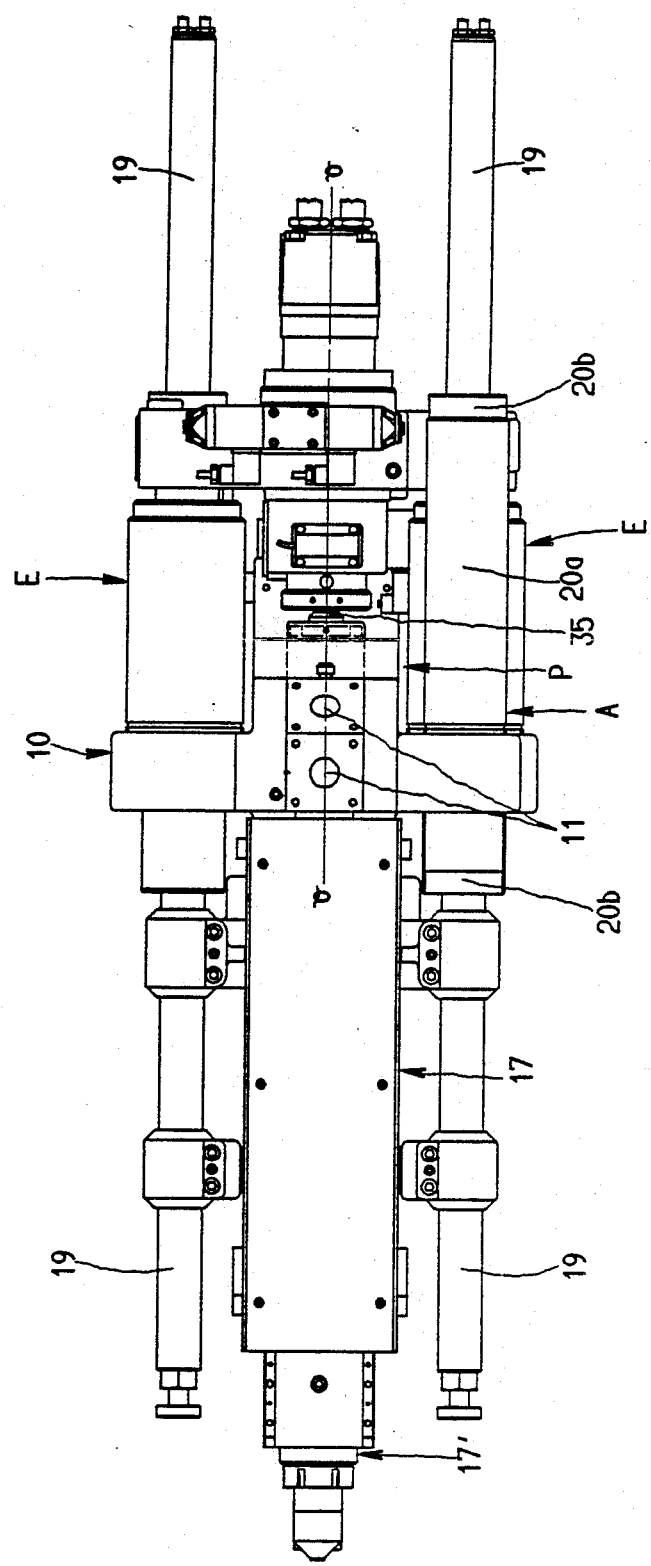

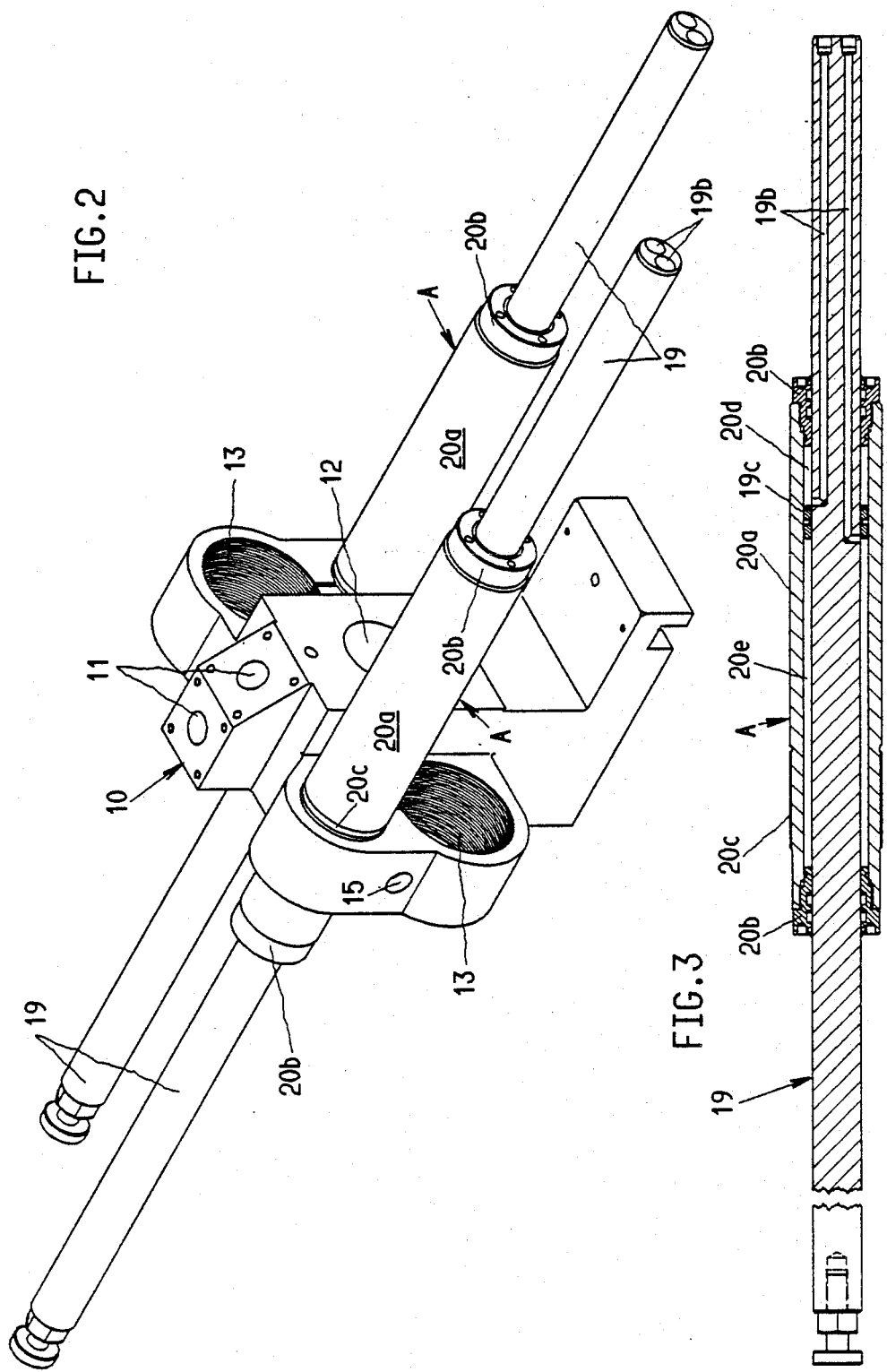

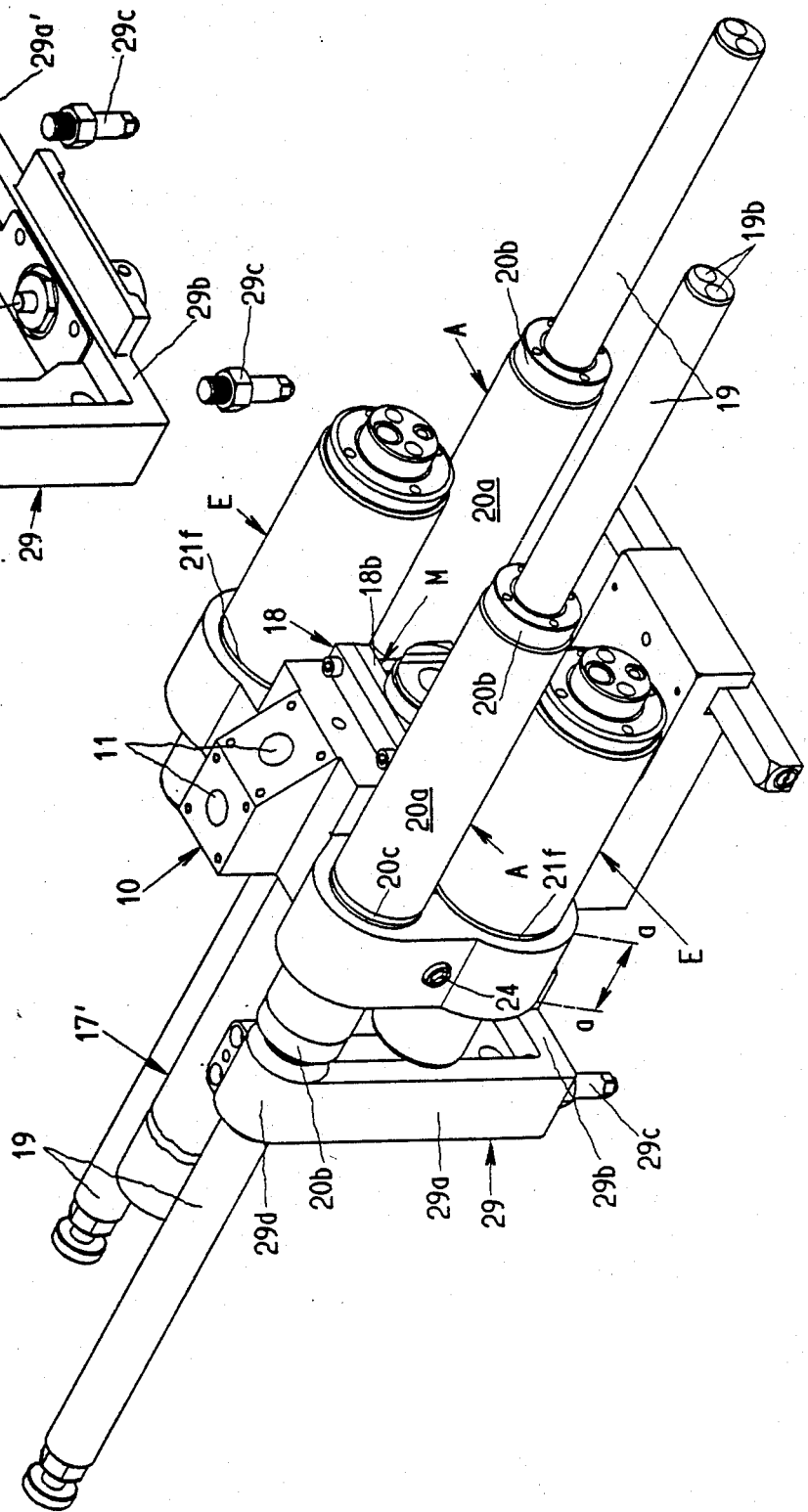

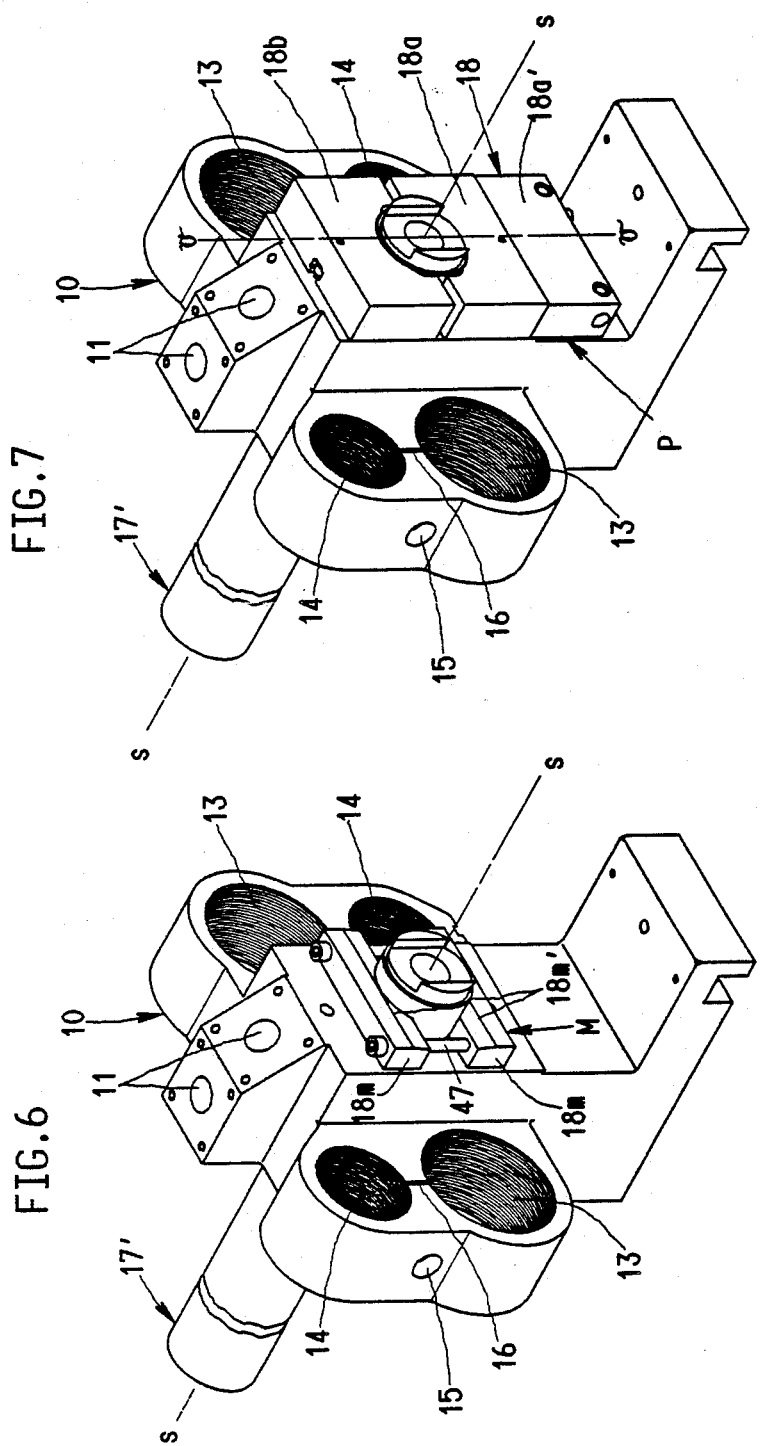

LOCKING APPARATUS FOR LOCKING A DETACHABLY MOUNTED PLASTICIZING CYLINDER OF A PLASTICIZING UNIT IN OPERATIVE POSITION TO A CARRYING BLOCK OF AN INJECTION UNIT OF AN INJECTION MOLDING MACHINE

BACKGROUND OF THE INVENTION

1. Field of the Invention

This invention relates to a locking apparatus for locking a detachably mounted plasticizing cylinder of a plasticizing unit in operative position to a carrying block of an injecting unit of an injection molding machine by means of two sliders, which are disposed on opposite sides of the axis of the plasticizing cylinder and are radially movable and are adapted to axially interlock with the plasticizing cylinder in its operative position, and at least one hydraulic unlocking cylinder for moving said sliders from their locking position until they strike on a stop so as to release the plasticizing cylinder.

2. Description of the Prior Art

U.S. Pat. No. 4,708,622 discloses a locking apparatus which is of the kind described hereinbefore and in which unlocking cylinders are fixedly mounted in the injecting unit and comprise a movable actuating element for controlling the sliders of the locking apparatus. Such a locking apparatus is not operative until the associated injecting unit has completely been installed. In accordance with U.S. Pat. No. 4,708,622, the plasticizing cylinder is axially backed by a first pair of sliders and is axially clamped by means of a second pair of sliders, which have beveled surfaces of the plasticizing cylinder.

Description of the Prior Art

In view of that prior art it is an object of the invention so to improve a locking apparatus which is of the kind described first hereinbefore that such apparatus can be more economically manufactured in series and particularly assembled because the apparatus constitutes an operative unit, which is detachably mounted on the carrying block and can be replaced by a few manual operations, for instance, when repairs are required.

That object is accomplished in accordance with the invention in that the sliders are interconnected by two unlocking cylinders, which are disposed on opposite sides of the vertical longitudinal plane of symmetry of the locking apparatus and are symmetrical with respect to a point on said plane (that is, the unlocking cylinders are arranged symmetrically to one another relative to the plane), one functional part of each unlocking cylinder is integrated in one of the sliders, which is a clamping slider, and the other functional part of each unlocking cylinder protrudes from the clamping slider and is secured to the other slider, which is a backing slider.

In the use of such a locking apparatus the frictional resistances between the sliders and their guides will determine whether the clamping slider or the backing slider will be the first to move out of its locking position upon an actuation of the unlocking cylinders or whether the movements of the two sliders will overlap in time. Because said frictional resistances between the two sliders and their guides will not be equal, as a rule, an actuation of the unlocking cylinders will impart asynchronous movements to the sliders out of their locking position, and the movements of the sliders to their locking position by the springs will be asynchronous too. On the other hand, the asynchronous movement of the sliders will not adversely affect the safety of the locking action and the speed of the movement to the locking position. Owing to the described design, the locking apparatus constitutes a unit, which is very simple so that it can be manufactured at low cost, and which can be mounted on or removed from the carrying block of the injecting unit in a simple assembling operation and can be tested for its operative condition before it is mounted on the injecting unit and can be kept in stock as a unit.

Because the locking apparatus can be removed as a unit from the carrying block, said unit can be replaced in case of need by an extremely simple, inexpensive mechanical locking apparatus, which comprises two locking bars, which can be forced against each other in their locking position by screw-threaded bolts and have engaging portions which are virtually identical with the engaging portions of the sliders which are hydraulically operable under program control.

The optional use of a mechanical locking apparatus and a hydraulic locking apparatus which is operable under program control for an automatic replacement of the plasticizing unit may be desirable, e.g., if a customer desires to acquire an injecting unit at the lowest possible cost and has the intention to provide the injecting unit with a hydraulic locking apparatus at a later time.

Brief Description of the Drawing

FIG. 1 is a top plan view showing an injecting unit which is provided with an illustrative embodiment of the locking apparatus in accordance with the invention.

FIG. 2 is a perspective view showing on an enlarged scale the carrying block of the plasticizing unit provided with advance-retract cylinders.

FIG. 3 is a longitudinal sectional view showing an advance-retract cylinder of the injecting unit.

FIG. 4 is a view that is similar to FIG. 2 and shows the carrying block of the injecting unit when the advance-retract cylinders and injection cylinders have been inserted and the plasticizing cylinder has been locked in its operative position and also shows a yoke for supporting the guide rods.

FIG. 5 shows the supporting yoke of FIG. 4, which is provided with a hydraulic retaining cylinder for axially retaining the plasticizing cylinder.

FIG. 6 shows the carrying block provided with a locking apparatus which is adapted to be actuated by hand.

FIG. 7 shows the carrying block provided with a hydraulic locking apparatus.

Detailed Description of the Preferred Embodiment

Figure 8:
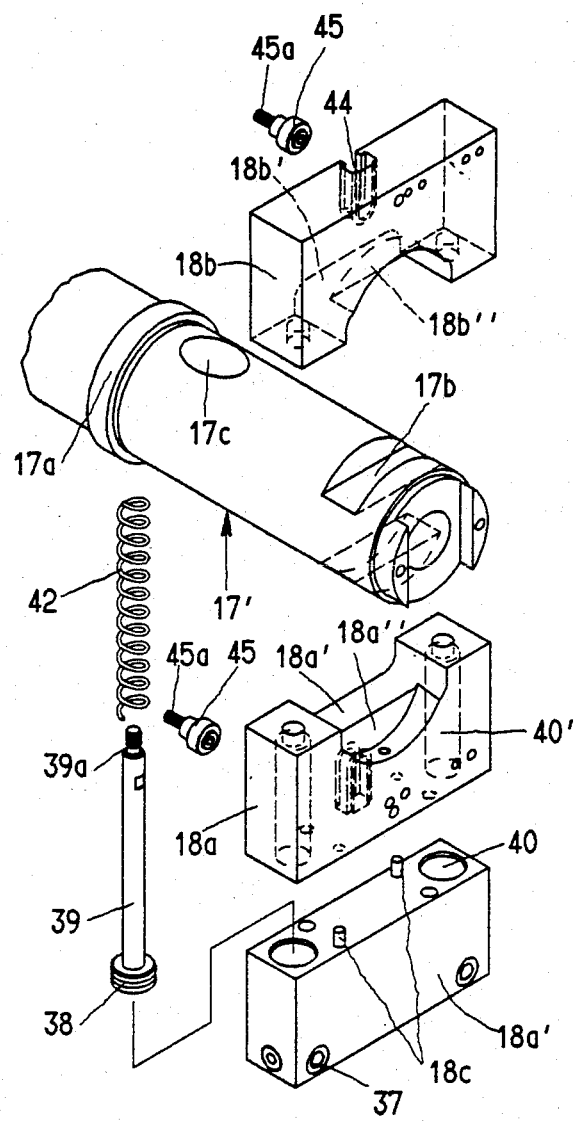
FIG. 8 is an exploded view showing the locking apparatus according to FIG. 7.

The invention will now be explained more in detail with reference to an illustrative embodiment.

An injecting unit provided with the locking apparatus P in accordance with the invention comprises a carrying block 10, which receives the plasticizing cylinder 17' of a plasticizing unit 17. Hydraulic advance-retract cylinders A for axially displacing the injecting unit on guide rods 19 are received in bores 14 of the block 10. The pistons 19c of the advance-retract cylinders A are secured to the guide rods 19. The carrying block 10 is formed with two additional bores 13, which receive hydraulic injection cylinders E for axially actuating a rotary feed screw 35, which is contained in the plasticizing cylinder 17. The advance-retract cylinders A and the injection cylinders E are provided with external screw threads 20c and 21f, which are in screw-threaded engagement with internal screw threads formed in the bores 14, 13. When the cylinders A and E have been adjusted to an operative position they can be clamped in that position by means of a clamp screw 24, which is adapted to deform the carrying block 10 for a clamping action owing to the provision of a slot 16 formed between the bores 14, 13. The clamp screw 24 is screwed into a tapped bore 15. As is particularly apparent from FIGS. 6, 7, the two bores 14 for the advance-retract cylinders A are diagonally spaced apart in the carrying block 10 of the injecting unit and so are the two additional bores 13 for the injection cylinders E. As a result, the carrying block 10 consists of two halves which are mirror images of each other and each of which contains a bore 14 and another bore 13. The bores 14 are disposed on opposite sides of the vertical longitudinal plane of symmetry v—v of the locking apparatus and are symmetrical to a point of said plane. This applies also to the bores 13. The design of the advance-retract cylinder A is illustrated in FIG. 3. The guide rods 19 constitute the piston rods of the advance-retract cylinders A. The cylinders proper are constituted by steel bushings 20a and surround the guide rods 19 with a clearance so as to define working chambers 20e and 20d, to which oil under pressure can be supplied in alternation through bores 19b formed in the guide rods 19. As the injecting unit is mounted on and removed from the injection mold, the cylinder covers 20b of the advance-retract cylinders A of the injecting unit slide on the peripheral surfaces of the guide rods 19.

It is particularly apparent from FIGS. 4, 5 that the guide rods 19 are supported by a stationary supporting yoke 29 and adjusting screws 29c on a pedestal of the injection molding machine. The supporting yoke 29 comprises a relatively long supporting leg 29a and a relatively short supporting leg 29a'. By means of clamping sleeves 29d the supporting legs are connected to the guide rods 19 in front of and close to the forward ends of the advance-retract cylinders A. The supporting legs 29a, 29a' are interconnected by a crosspiece 29b. A vertical hydraulic retaining cylinder 46 (FIG. 5) extends through the crosspiece 29b at its center and serves to temporarily retain the plasticizing unit 17 against an axial movement.

The pasticizing cylinder 17' has a gravity feed opening 17c (FIG. 8), which when the plasticizing cylinder is in operative position is disposed at the outlet of the feed passage 11 (FIGS. 1, 2, 4, 6, 7), which is formed in the carrying block 10 and through which the plastic material is delivered to the plasticizing cylinder 17'.

Figure 9:
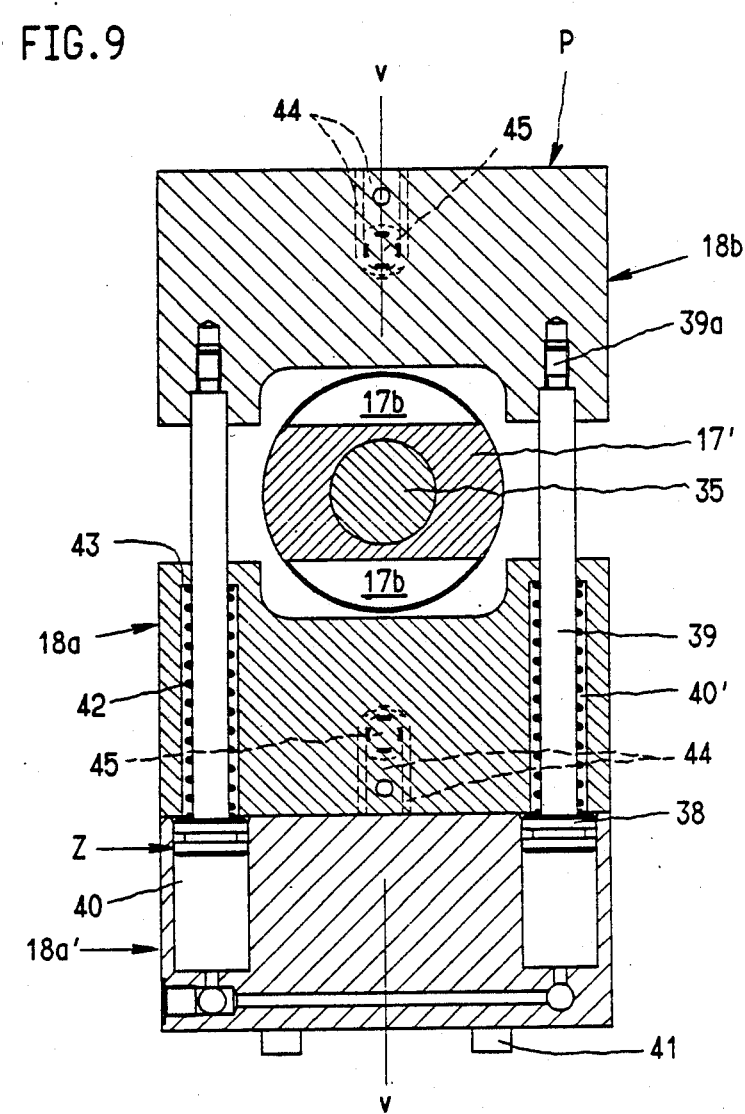
FIGS. 9 and 9a are sectional views taken on a vertical plane which is at right angles to the plane of symmetry and shows the locking apparatus of 7 and 8 in locking and unlocking positions, respectively.
Figure 10:
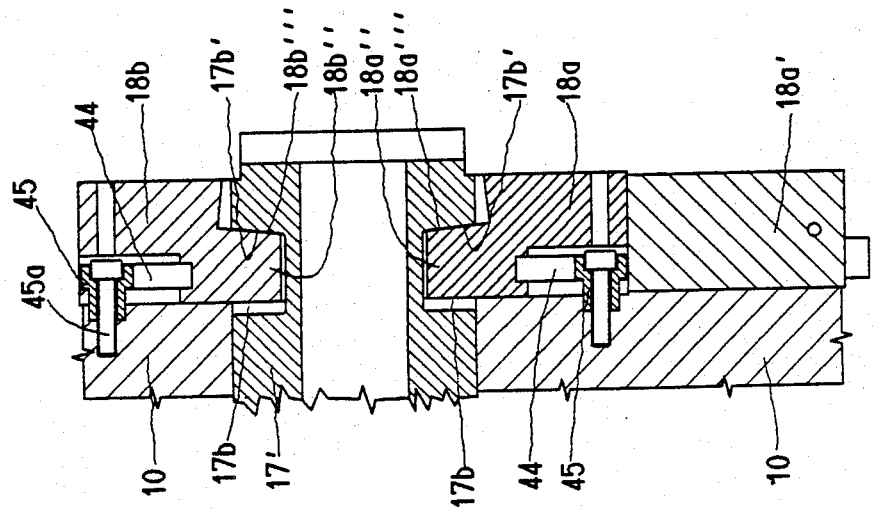
FIG. 10 is a vertical sectional view taken on a plane that extends through the injection axis and shows the locking apparatus in accordance with FIGS. 7 and 8.
Figure 9A:
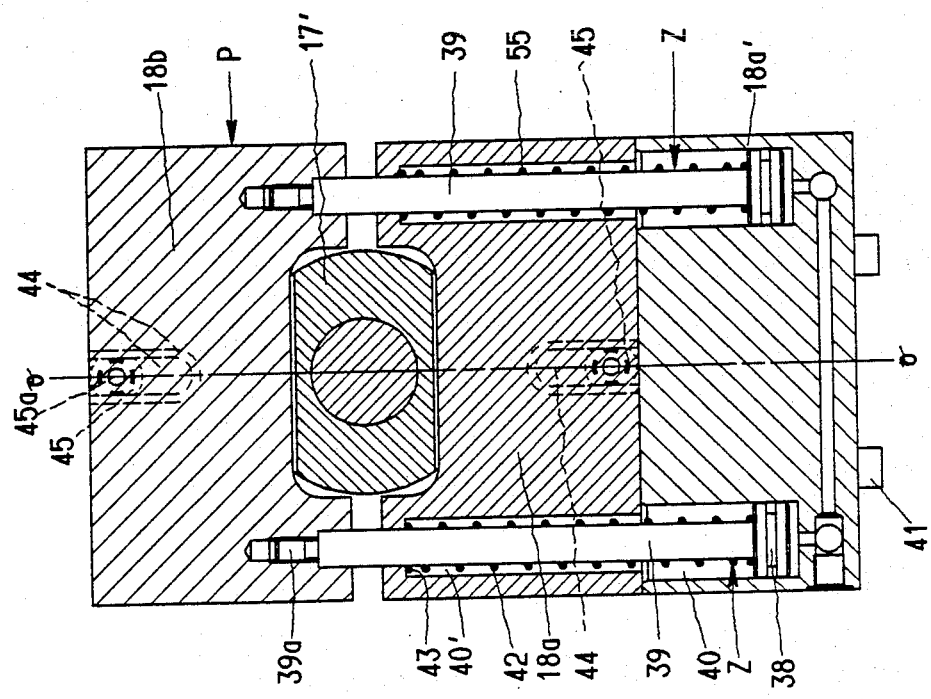

A clamping slider 18a, 18a' and a backing slider 18b are provided, which are disposed on opposite sides of the axis of the plasticizing cylinder 17' and are in sliding contact with the planar rear surface of the carrying block 10 and are formed with guiding grooves 44, which are guided on sliding heads 45, which are anchored in the carrying block 10 by means of bolts 45a, as is particularly apparent from FIGS. 10. The guiding grooves 44 are centered on the vertical longitudinal plane of symmetry v—v of the locking apparatus. The guiding grooves 44 in the blocking slider 18b have open ends at the top edge of said slider. The guiding grooves 44 of the bipartite clamping slider 18a, 18a' are covered on one side by an outer part 18a' of said slider. In that outer slider part 18a', the cylinders proper of the unlocking cylinders Z are constituted by blind bores 40, which are coaxially aligned with blind bores 40' formed in an inner slider part 18a of the clamping slider 18a, 18a'. The outer slider part 18a' is secured to and centered relative to the inner slider part 18a by means of bolts 41 (FIG. 9) and by centering pins 18c (FIG. 8), respectively. The piston rods 39 of the unlocking cylinders Z extend through the bores 40' and protrude out of the clamping slider 18a, 18a' and terminate in screw-threaded end portions 39a, which are screwed into the backing slider 18b. The bores 40' contain coil springs 42, which surround the piston rods 39 and bear at one end on annular shoulders 43, which are formed at the transition from the bore 40' to a bore which is a close fit on the piston rod (FIGS. 8, 9). At their other end, the coil springs 42 bear on the rear ends of the pistons 38. The length of the unlocking stroke of the unlocking cylinders Z is determined by the axial length of the bores 40, which are larger in diameter than the bores 40' which contain the springs 42. In the position shown in FIGS. 9a and 10 the unlocking cylinders Z are unpressurized in their initial position, in which the pistons 38 are disposed at the bottom end of the bores 40, so that the sliders 18a, 18a'; 18b are in their locking position. For an unlocking, pressure oil is supplied through port bores 37 into the working chambers of the unlocking cylinders Z to apply pressure to the pistons 38. During their unlocking stroke the pistons 38 move into engagement with annular shoulders which are disposed at the transition from the top end of each bore 40 to the adjacent bore 40'. As a result, an unlocking is effected in that the sliders 18a, 18a'; 18b are moved apart as far as possible to a position in which the sliding heads 45 bear at those ends of the guiding grooves 44 which are adjacent to the injection axis s-s.

The carrying block 10 has a central bore 12 (FIG. 2), by which the rear part of the plasticizing cylinder 17' of the plasticizing unit 17 is received as a close fit. The rear end of the plasticizing cylinder 17' protrudes from the carrying block 10 and in its rear end face is formed with diametral retaining grooves 17b, which are adapted to receive segment-shaped engaging portions 18a''', 18b'' of the sliders 18a, 18a'; 18b as said sliders move to their locking position. The engaging portions 18a'', 18b'' have bevelled surfaces 18a''', 18b''', which in the locking position of the sliders bear on said beveled side faces 17b' of the retaining grooves 17b. In front of its rear end face, the plasticizing cylinder 17' is provided with an annular flange 17a, which is spaced such an axial distance from the retaining groove 17b that when the plasticizing cylinder 17' is locked the annular flange 17a will bear on the forward end face of the carrying block 10 to act as an abutment. When the plasticizing cylinder 17' bears axially on said abutment, it will axially be pre-stressed as the beveled surfaces 18a'''', 18b'''' run up on the side faces 17b' of the retaining grooves 17b.

The locking apparatus constitutes a unit, which is connected to the carrying block 10 only by the sliding heads 45. The sliders 18a, 18a'; 18b can be moved relative to each other to an extent which is determined by the length of the guiding grooves 44.

The retaining cylinder 46 is operable to axially retain the plasticizing cylinder 17' and the plasticizing unit when this is required. To ensure that the unlocking and axial retention of the plasticizing unit 17 will be synchronized, the unlocking cylinders Z and the retaining cylinder 46 are hydraulically interconnected for being operated at the same time. When the sliders 18a, 18a'; 18b are in their unlocking position, the axially retained plasticizing unit 17 can be moved away from the carrying block 10 in that a limited rearward movement is imparted to said block in the course of a retracting stroke of the advance-retract cylinders A.

The plasticizing unit 17 can be locked to the carrying block 10 by means of a mechanical locking apparatus M when this is desired. That mechanical locking apparatus M comprises two locking bars 18m which can be forced toward each other in locking position by screws 47 and have engaging portions 18m', which are identical to the engaging portions 18a"; 18b" of the hydraulically operated sliders 18a, 18a'; which are hydraulically operated under program control by the computer of the injection molding machine so that the plasticizing unit can automatically be replaced.

Because the locking apparatus P or M is provided on the carrying block 10 in an open arrangement, which can easily be inspected, the special advantage is afforded that the operator can determine at a glance whether or not the plasticizing unit 17 is locked to the carrying block 10. This was not the case with the "closed" design used thus far.

In the illustrative embodiment shown on the drawing, the sliders 18a, 18a'; 18b are interconnected by two single-acting unlocking cylinders Z. But it will be understood that double-acting hydraulic cylinders may be used for that purpose so that the sliders can then be moved to and held in their engaging positions also by hydraulic action, without spring force. In such case each unlocking cylinder will have a rear working chamber, to which pressure oil is supplied for unlocking the plasticizing cylinder, and with a forward working chamber, which is supplied with pressure oil for locking the plasticizing cylinder.

I claim:

1. In an injection molding machine having a locking apparatus for locking a detachably mounted plasticizing cylinder in an operative position to a carrying block of an injecting unit of said machine, which locking apparatus has a vertical longitudinal plane of symmetry and comprises
    two sliders, which are arranged on opposite sides of the axis of said plasticizing cylinder and are arranged to be radially movable on said cylinder for a movement between a locking position for positively locking said plasticizing cylinder in said operative position to said carrying block, and an unlocking position, which is defined by a stop and in which said sliders release said plasticizing cylinder for its removal from said carrying block, and
    hydraulic unlocking cylinder means, which are operatively connected to said sliders and operable to move said sliders from said locking position to said unlocking position,
    the improvement wherein
    said unlocking cylinder means comprise two unlocking cylinders, which are disposed on opposite sides of said plane of symmetry and are symmetrical to one another with respect to said plane,
    said sliders consist of a clamping slider and backing slider,
    each of said unlocking cylinders comprises two functional parts consisting of a cylinder proper and a piston and piston rod,
    one of said functional parts of each of said unlocking cylinders is integrated in said clamping slider,
    the other of said functional parts of each said unlocking cylinders protrudes from said clamping slider and is secured to said backing slider.

2. The machine as set forth in claim 1, the improvement wherein
    said clamping slider is formed with two bores, which constitute said cylinders proper of said unlocking cylinders,
    each of said bores is defined at one end by an annular shoulder,
    each of said bores contain a coil spring, which bears at one end on the associated one of said pistons and at the other end on the associated annular shoulder, and
    piston rods are connected to respective ones of said pistons and have cross-threaded end portions, which protrude from said clamping slider and are screwed into said backing slider.

3. The machine as set forth in claim 1, wherein said carrying block has a planar rear end face and carries sliding heads, the improvement wherein
    said sliders are arranged to slide on said rear end face of said plasticizing cylinder and are symmetrical to said plane of symmetry and are formed with vertical guiding grooves centered on said plane of symmetry and arranged to be guided on said sliding heads as said sliders move between said locking and unlocking positions.

4. The machine as set forth in claim 3, the improvement wherein
    said guiding grooves formed in said backing slider are open at one end,
    said clamping slider comprises an inner slider part, which is formed with said guiding grooves of said clamping slider and with blind bores, and an outer slider part, which covers said guiding grooves of said clamping slider and is formed with blind bores, which constitute the cylinders proper of said unlocking cylinders and are coaxially aligned with said blind bores of said inner slider part.

5. The machine as set forth in claim 1 wherein said carrying block has a central bore for receiving said plasticizing cylinder at its rear end as a snug fit in a position in which said rear end of said cylinder protrudes from the rear of said carrying block, said plasticizing cylinder being formed in its rear end face with diametrically extending retaining grooves having beveled side faces, said plasticizing cylinder being formed in front of said rear end face with an annular flange arranged to bear on said carrying block at its forward end when said plasticizing cylinder is in said operative position, the improvement wherein
    said sliders have segment-shaped engaging portions arranged to be slidably inserted into and to interlock with said retaining grooves,
    said engaging portions have beveled surfaces which are arranged to bear on said beveled side faces of said retaining grooves when said sliders are in said locking position.

6. The machine as set forth in claim 1, further wherein said unlocking cylinders are double-acting cylinders operable also to move said sliders also from said unlocking position to said locking position.

7. The machine as set forth in claim 1, further comprising
a hydraulic retaining cylinder operable to axially retain said plasticizing unit and
means for supplying a hydraulic fluid to said unlocking cylinders and to said retaining cylinder at the same time.

8. The machine as set forth in claim 1, wherein said injecting unit comprises advance-retract cylinders operable to advance and retract said carrying block, the improvement wherein
said plasticizing unit when axially retained by said retaining cylinder is arranged to be removed from said block by a retracting movement imparted to said block by said advance-retract cylinders when said sliders are in said unlocking position.

9. The machine as set forth in claim 1, wherein said plasticizing cylinder is arranged to be locked in its operative position to said carrying block by means of a mechanical locking apparatus, the improvement wherein
said sliders have engaging portions for engaging said plasticizing cylinder in said operative position when said sliders are in their locking position and
said mechanical locking apparatus comprises two locking bars having engaging portions designed like those of said sliders, and screws for forcing said locking bars toward one each other so as to force said engaging portions of said locking bars against said plasticizing cylinder.

* * * * *